3,072,134
WATER TREATMENT SYSTEM
Milo V. Williamson, 2079 Market St., Apt. 25,
San Francisco, Calif.
Filed June 18, 1959, Ser. No. 821,315
5 Claims. (Cl. 137—114)

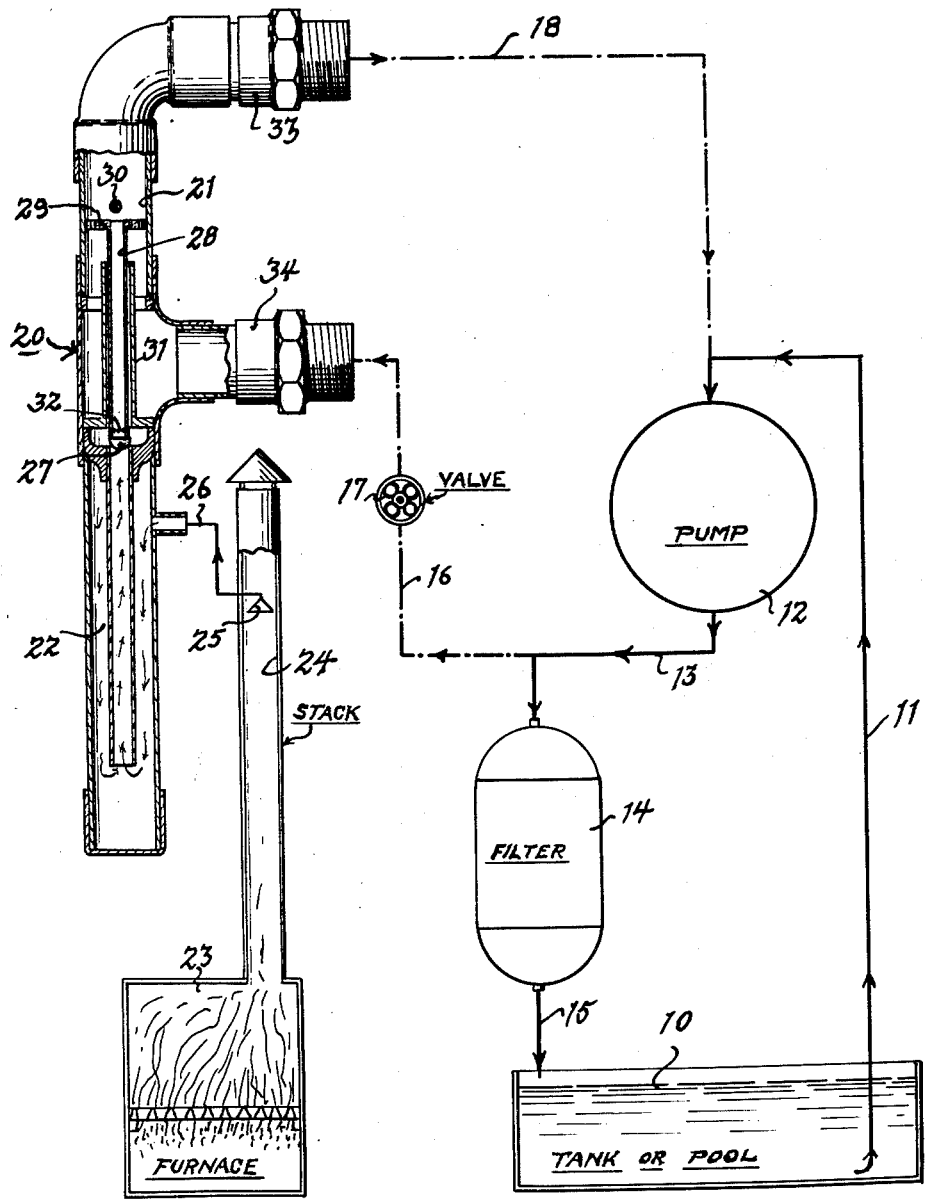

My present invention relates to water treatment and more particularly to a system and apparatus for treating swimming pool green water to inhibit growth of algae and the accumulation of slime and has for its principal object the provision of a device by which an algae and slime inhibiting gas may be introduced into a water circulating system connected to the pool of water to be treated.

Another object of the invention is to provide a simple device for introducing carbon monoxide gas resulting from the combustion of fuel into a circulating water system.

Other objects and advantages of the invention will be in part evident to those skilled in the art and in part pointed out hereinafter in connection with the accompanying drawing wherein there is shown by way of illustration and not of limitation a preferred embodiment of the invention.

The single FIGURE of the drawing shows the invention as employed for the treatment of the water of a swimming pool or tank in which water is accumulated or stored having a conventional pump operated water circulating system.

In the drawing 10 designates a tank or pool of water which may be a conventional swimming pool or a water storage tank. Connecting with the pool 10 by a conduit 11, there is a rotary or centrifugal water circulating pump 12 having an outlet or discharge conduit 13 that conducts a circulation of water to a filter 14 from which said circulating water is returned to the pool through a conduit 15. In addition to the water circulating system just described, there is a by-pass connection leading from the discharge conduit 13 of the pump 12 which includes a conduit 16 having a flow regulating valve 17 and a return conduit 18 that connects with the intake side of the pump 12. The valve 17 is adapted and arranged to control and/or limit the flow of water through the by-pass circuit formed by the conduits 16 and 18. As schematically shown, my invention involves an algae and slime inhibiting gas introducing device, designated generally by the numeral 20, that will operate to cause a pulsating flow of water in the by-pass circuit formed by the conduits 16 and 18 which will entrap quantities of the inhibiting gas and this entrapped gas will be introduced into the main water circulating system and finally to the tank or pool at the intake side of the pump 12.

The apparatus or device 20 of my invention as illustrated in the drawing works on the injector principle and has a cylindrical chamber 21 at its upper end and a gas accumulating chamber 22 at its lower end. Associated with the gas accumulating chamber 22 I show a combustion chamber or furnace 23 having a stack 24 in which an inverted gas collecting bell 25 is located and leading from the gas collecting bell 25 there is a conduit 26 through which the collected gas is introduced into the gas accumulating chamber 22. The gas accumulating chamber 22 has a depending tubular outlet pipe and at its upper end, this outlet pipe has a valve seat against which a valve member 27 is held by gravity. The valve member 27 is carried at the lower end of a tubular piston rod 28 having a piston head 29 that is freely moveable in the cylindrical chamber 21 under the influence of circulating fluid pressure. A stop 30 is also provided to limit the upward movement of the piston 29 and for the passage of gas from the gas accumulating chamber 22, the piston rod 28 is loosely fitted within a tubular sleeve 31 and it also has a series of small ports 32 at the lower end through which gas may flow to the interior thereof.

The operation of my device when constructed and connected in the above manner is as follows: As the pump 12 operates it will draw water from the bottom of the pool 10 through the conduit 11 and return said water to the pool at a more remote point through the conduit 15. Then as this cycling of the water continues a definite lesser amount of the water passing through the pump 12 will be by-passed through the conduits 16 and 18 and enter into the cylindrical chamber 21 of the device 20. This flow of water will pass through and around the loosely fitting piston 29 to an elbow and nipple assembly 33 to which the by-pass conduit 18 is connected. At the point where the conduit 16 is attached to the device 20 a similar extension and connecting nipple assembly 34 is also provided. As this flow of by-passed water continues upwardly through the cylindrical chamber 21, the piston 29 will be subjected to a pressure caused by the velocity of flowing fluid sufficient to lift it and open the valve 27 of the gas accumulating chamber 22. When this occurs gas will enter into the cylinder 21 and thus vent or break the suction in the by-pass conduit 18 of the pump. Then as a result the valve 27 and the piston 29 will drop due to gravity and again momentarily close the port of the gas accumulating chamber 22. As the circulation of water continues this periodic operation of the valve 27 will cause a pulsating flow with the entrapped gas which has entered from the accumulating chamber 22 and this water with the entrapped or absorbed gas will subsequently be returned to the pump 12 where it will become recirculated through the pool 10.

In the drawing the inverted gas collecting bell 25 is shown as in the stack 24 of a coal or wood burning furnace 23, but this supply of gas may be furnished by a pool water heater or shower water heater such as is commonly provided with public or private pools. Such a source of gas will economically furnish carbon monoxide gas which can be collected and retained in the gas accumulating chamber 22. It is also conceivable that this supply of carbon monoxide gas may be obtained by other means, for example from a pressurized bottle as commonly supplied in the chemical trade. Even the exhaust from an automobile might be called on as a source of supply of this gas.

As a further element in the matter of a control for the system as outlined above, it is contemplated that the operation of the water circulating pump 12 may be controlled by means of a thermally responsive pump motor circuit controlling switch in the stack 24 which will provide for an operation of the pump 12 only when the temperature in the stack 24 is up to or above a certain temperature. In accordance with another aspect, it is contemplated that with the water circulating pump 12, responsive to the temperature in the water pool 10, there may be introduced into the pump motor control circuit a temperature responsive means which would insure that the carbon monoxide generating furnace or source of supply is in operation when the pump is operating.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I desire to claim and secure by Letters Patent is:

1. For use in a system for inhibiting the growth of algae in swimming pools and the like for operation with a uniform flow pool water recirculating pump having a by-pass conduit extending between the outlet and inlet ports of the pump, the improvement comprising in combination with a source of dry inert gas, a unit including a chamber in which said inert gas is accumulated having a valve port at its upper end, a valve member for opening and closing said valve port, a means forming cylindrical chamber above and in axial alignment with the port of said gas accumulating chamber, means at the lower end of said cylindrical chamber forming a by-pass fluid conducting connection for communicating with the discharge side of said pool water circulating pump, a second means forming an outlet at the upper end of cylindrical chamber having a connection for communicating with the intake side of said pump, whereby water flowing in said by-pass conduit will circulate in an upward direction in passing through said cylindrical chamber, and a free floating piston-like member positioned between the inlet and oulet ports of said cylindrical chamber having an operating connection with the valve member at the outlet port of said gas accumulating chamber, said piston-like member being responsive to upward surges of water in said cylindrical chamber and operating to periodically introduce gas from said gas accumulating chamber into said cylindrical chamber upon each upward movement thereof.

2. For use in a system for inhibiting the growth of algae in swimming pools and like bodies of water having a pool water recirculating system including a substantially constant flow pump with a by-pass conduit extending therearound through which a limited flow of the recirculating water is circulated, the improvement comprising a dry gas introducing means having a vertically disposed cylindrical chamber for receiving therethrough water circulating in the by-pass conduit of said pump, said chamber having a fluid outlet port at its upper end and an inlet port at its lower end with said outlet and inlet ports having connections for communicating with the by-pass conduit of said pump by which water flowing in said by-pass will be directed upwardly through said cylindrical chamber, a gas accumulating chamber located below said cylindrical chamber, means for maintaining an accumulation of an algae growth inhibiting gas in said gas accumulating chamber, a valve member for controlling the flow of gas from said accumulating chamber to said cylindrical chamber, a freely fitting piston-like member located within said cylindrical chamber responsive to the upward flow of water therethrough, and a tubular connecting rod carried by said piston-like member forming a gas conducting connection between said freely fitting piston and the valve port at the upper end of said gas accumulating chamber, whereby the valve port of said gas accumulating chamber will be opened and admit gas into said cylindrical chamber upon each upward operation of said piston-like member.

3. In an algae and slime inhibiting system including a pool of water to be treated, a constant flow pump for circulating water from and back to said pool, a water conducting connection extending from the discharge outlet back to the intake line of said pump and forming a by-pass circuit for regulating the amount of water flowing in said by-pass circuit; the improvement comprising a vertically disposed gas introducing means for connection in said by-pass circuit, said gas introducing means having a cylindrical chamber through which circulating water in said by-pass circuit is adapted to pass upwardly when said pump is operating, a source of carbon monoxide gas, a carbon monoxide gas accumulating chamber mounted below the cylindrical chamber of said gas introducing means, a conduit having a valve port through which carbon monoxide gas may pass upwardly from said gas accumulating chamber to said cylindrical chamber, a valve member for closing said port and controlling the flow of gas from said gas accumulating chamber to said cylindrical chamber, and a free floating piston-like member mounted in said cylindrical chamber responsive to upward flow of water therethrough and operatively connected to said valve member, whereby carbon monoxide gas will be admitted to said cylindrical chamber from said gas accumulating chamber in an intermittent manner as said piston-like member operates in response to changes in the upward flow of water through said cylindrical chamber due to the periodic admission of accumulated gas in said by-pass circuit by the action of said gas introducing means.

4. For use in a green water treating system for preventing the formation of algae and slime in swimming pools and water storage tanks of the type having a pump for re-circulating water in a substantially uniform manner from and back to said pool, and a by-pass conduit for the flow of a limited amount of the circulating water from the discharge port and back to the inlet port of said pump, the improvement comprising the combination of a carbon monoxide gas introducing means for connection in said by-pass conduit, said gas introducing means having a cylindrical chamber through which water will pass upwardly when circulating in said by-pass conduit, a throttling valve operatively connected to said cylindrical chamber for regulating the flow of water through said cylindrical chamber, a carbon monoxide accumulating chamber located below and in co-extending relation with said cylindrical chamber, a source of carbon monoxide gas for said gas accumulating chamber, a piston-like member having a depending stem mounted for upward movement in the cylindrical chamber of said means responsive to an upward flow of water through said cylindrical chamber, a valve member at the lower end of the stem of said piston-like member, a valve port at the upper end of said gas accumulating chamber with which said valve member cooperates, the depending stem of said piston-like member being tubular and open through said piston-like member at its upper end and having port openings at its lower end located above said valve member through which carbon monoxide gas will flow from said gas accumulating chamber to the interior of said cylindrical chamber, whereby said piston-like member is periodically moved upwardly by the flow of water circulating upwardly through said chamber and downwardly upon loss of suction by the pump in said by-pass conduit due to the admission of gas into said cylindrical chamber through the depending stem of said piston-like member.

5. For use in a green water treating system for preventing the formation of algae and slime in swimming pools and water storage tanks including a pool of still water to be treated, a pump for maintaining a substantially uniform re-circulation of water from and back to said pool, a by-pass conduit extending from an outlet port to an inlet port of said pump through which a limited flow of the circulating water discharged at the outlet port of the pump will flow, the improvement comprising a gas introducing means for connection in the by-pass circuit, said gas introducing means having a vertically disposed cylindrical chamber for receiving circulating water from the by-pass conduit when said pump is in operation, a control valve operatively connected to said cylindrical chamber for controlling the flow of water therethrough, a carbon monoxide gas accumulating chamber having an outlet port located below and in communicating relation with the interior of said cylindrical chamber, a source of carbon monoxide gas having connections for introducing said gas into said gas accumulating chamber, a free floating piston-like member mounted in said cylindrical chamber and movable upwardly in response to surges in the flow of water through said chamber having a depending tubular stem through which gas may pass, a valve member carried at the lower end of the tubular depending stem of said piston-like member cooperating with outlet port of said gas accumulating chamber to control the flow of carbon monoxide gas from said gas accumulating chamber to the interior of said cylindrical chamber, the depending tubular stem of said piston-like member being open at its upper end and having port openings above said valve member through which gas will flow through said cylindrical chamber and into said by-pass conduit as said piston-like member is lifted by an upward flow of water in said cylindrical chamber and periodically dropped due to loss of suction in said by-pass conduit by the introduction of said gas into said cylindrical chamber and the by-pass conduit around said pump.

References Cited in the file of this patent
UNITED STATES PATENTS

| | | |
|---|---|---|
| 2,140,401 | Fink | Dec. 13, 1938 |
| 2,162,074 | Everson | June 13, 1939 |
| 2,592,304 | Lubeley | Apr. 8, 1952 |
| 2,680,715 | Cook | June 8, 1954 |